(12) United States Patent  
Williams

(10) Patent No.: US 6,522,246 B1
(45) Date of Patent: Feb. 18, 2003

(54) MOTOR VEHICLE EMERGENCY SYSTEM

(76) Inventor: Joy A. Williams, 5417 Alfred Dr., Las Vegas, NV (US) 89108

( * ) Notice: Subject to any disclaimer, the term of this patent is extended or adjusted under 35 U.S.C. 154(b) by 0 days.

(21) Appl. No.: 09/848,746

(22) Filed: May 3, 2001

Related U.S. Application Data

(60) Provisional application No. 60/218,364, filed on Jul. 13, 2000.

(51) Int. Cl.[7] ................................................ B60Q 1/22
(52) U.S. Cl. ..................................... 340/463; 340/425.5
(58) Field of Search .................................. 340/463, 426, 340/425.5, 438; 307/10.2, 10.3, 10.4, 10.5; 180/287, 167; 379/37, 39

(56) References Cited

U.S. PATENT DOCUMENTS 5,706,909 A * 1/1998 Bevins ....................... 180/273
5,805,057 A * 9/1998 Eslaminovin ................ 340/426
5,838,227 A * 11/1998 Murray ..................... 340/425.5

* cited by examiner

*Primary Examiner*—Anh La
(74) *Attorney, Agent, or Firm*—Robert Ryan Morishita; Anderson & Morishita

(57) ABSTRACT

The present invention is an emergency system for a motor vehicle having an electrical system and an engine. The emergency system includes one or more lamps optionally mounted in the passenger compartment. The lamp is electrically connected to the motor vehicle's electrical system and to a control switch for actuating the lamp. A system for disabling the motor vehicle's engine may optionally be provided. The disabling system is electrically connected to the control switch. In one optional embodiment, upon actuation, the control switch simultaneously illuminates the lamp, optionally in a blinking fashion, and optionally disables the engine of the motor vehicle. In an alternate embodiment, the lamp and disabling means are separately controlled.

9 Claims, 2 Drawing Sheets

MOTOR VEHICLE EMERGENCY SYSTEM

RELATED APPLICATION DATA

The present application claims the priority of U.S. Provisional Application Ser. No. 60/218,364 entitled "Motor Vehicle Emergency Warning Light and Disabling Device" filed Jul. 13, 2000 by Applicant herein,

FIELD OF THE INVENTION

The present invention relates to emergency controls for motor vehicles. Specifically, the present invention is a manually actuated warning light or lights and optionally connected means for disabling the motor vehicle to thereby arrest the movement of the motor vehicle in the event of an emergency.

BACKGROUND OF THE INVENTION

Frequently, drivers in motor vehicles become incapacitated or otherwise unable to safely drive while driving. In such a situation, the driver often loses control of his or her motor vehicle and collides with another motor vehicle or leaves the road. In either instance, the driver could be seriously injured and could cause the injury or death of another.

Many attempts have been made to address these problems. For example, motor vehicles now come standard with emergency tail lights to alert other vehicles that the motor vehicle or the driver is disabled. However, one drawback of such systems is that the switch only illuminates the blinking emergency tail lights-the switch does not stop or otherwise slow the motor vehicle.

There are also a variety of means of cutting off the flow of fuel to the motor vehicle engine. These so-called "kill switches" are used in, and controlled by, some anti-theft systems to prevent theft of the motor vehicle. However, such "kill switches" are typically not used to stop the motor vehicle in the event of an emergency. Moreover, such "kill switches" do not include visible or audible warnings to other motorists to indicate that the driver may not have control of the motor vehicle and that the motor vehicle has been disabled.

Yet another system includes a locator device that is monitored by a centralized monitoring system. When assistance is required, the vehicle is located by the monitoring system and assistance is dispatched. One drawback of this system, however, is that the vehicle owner must subscribe to a service to participate in the monitoring system.

Therefore, it can be seen that there is a need in the art for a system for warning motorists of the disability or incapacitation of a driver and safely disabling the motor vehicle's engine.

SUMMARY OF THE INVENTION

The present invention is an emergency system for a motor vehicle of the type having an electrical system and an engine providing power to the drive wheels of the motor vehicle. The emergency system of the present invention includes at least one internal lamp, optionally mounted on the interior ceiling of the passenger compartment or near one or more of the doors of the motor vehicle. The lamp or lamps are electrically connected to the motor vehicle's electrical system. Optionally, the lamp or lamps are colored blinking lamps. The emergency system further includes a control switch to actuate the lamp or lamps. In an optional embodiment, the control switch is mounted on the steering wheel to allow easy access by the driver.

The present invention also includes a means for disabling the motor vehicle's engine. The disabling means could take a variety of forms including a fuel cutoff switch, an ignition switch, an electrical system switch, or the like. In one optional embodiment, the disabling means is electrically connected to the control switch, thereby allowing the driver to simultaneously activate the lamp or lamps and disable the engine of the motor vehicle in the event of an emergency. In an alternate embodiment, the disabling means and lamp may be separately controlled.

It is an object of the present invention to provide a system for disabling a motor vehicle and warning other drivers of the disability or incapacity of the driver without the necessity of subscribing to a monitoring service.

DESCRIPTION

Figure 1:
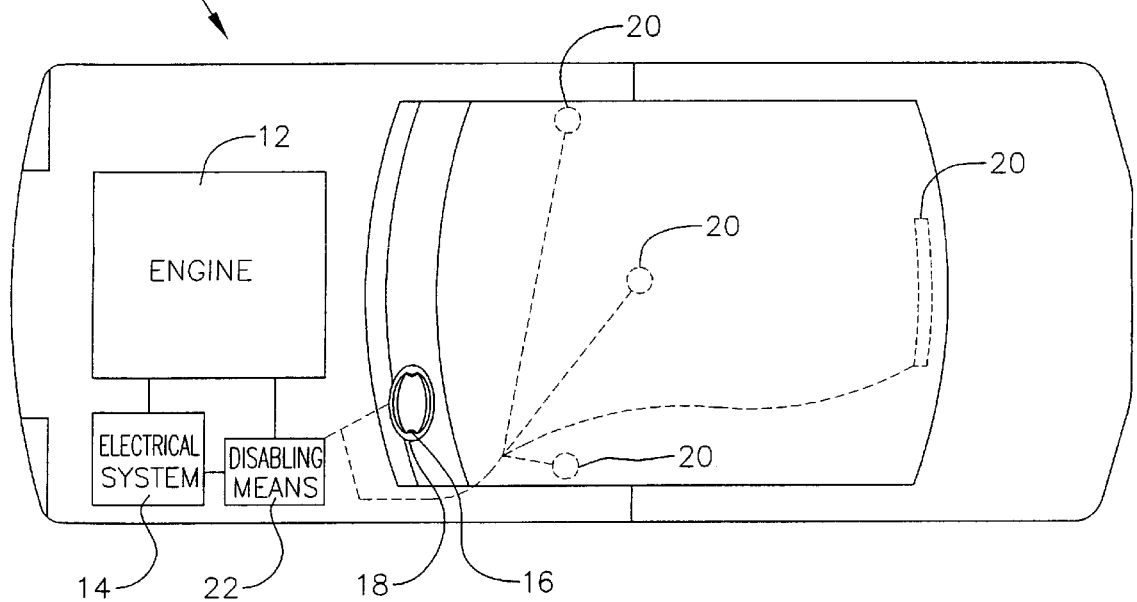
FIG. 1 is a top view of the emergency system of the present invention inside a motor vehicle.
Figure 3:
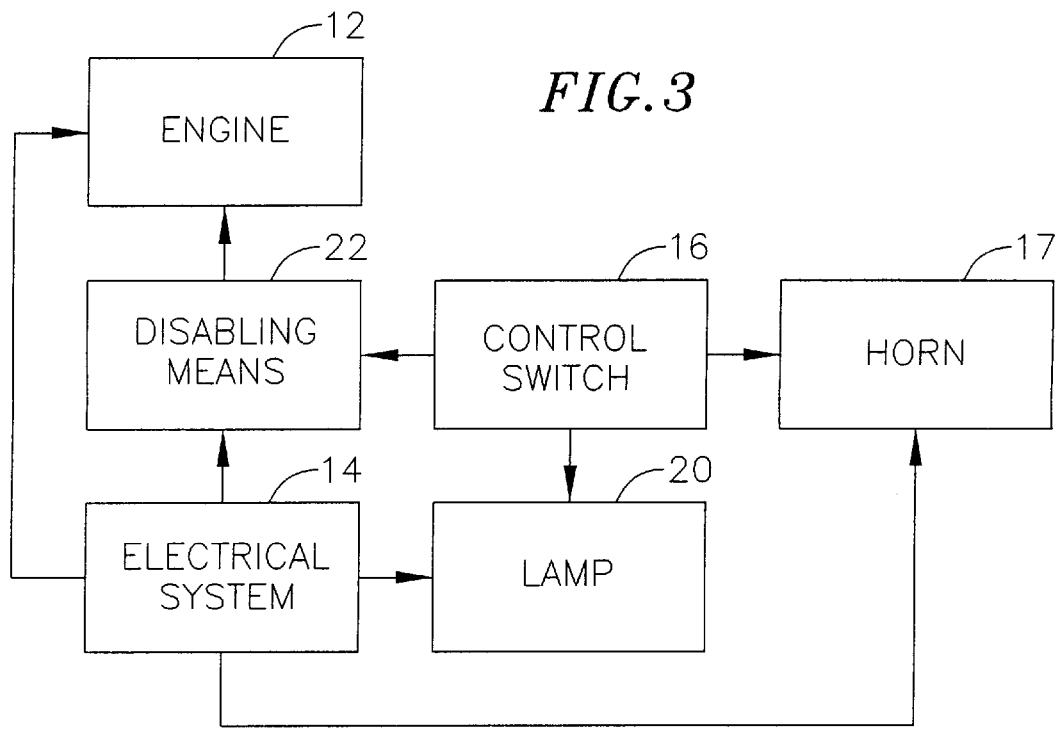
FIG. 3 is a block diagram of an emergency system according to an embodiment of the present invention.

Reference is now made to the figures wherein like parts are referred to by like numerals throughout. With reference to FIGS. 1 and 3, the present invention is an emergency system for a motor vehicle 10. The motor vehicle 10 is of a type having an engine 12 and an electrical system 14. The engine 10 could be any type known in the art including spark ignition, compression ignition, electrical, or the like, the purpose of which is to provide drive power to the motor vehicle's 10 wheels. The motor vehicle 10 could be of any type known in the art including a car, truck, van, bus, or any other type of motor vehicle 10.

Likewise, the electrical system 14 could be of any type known in the art for operating electrical devices in the motor vehicle 10 as well as assisting in starting the motor vehicle's 10 engine 12. For example, the electrical system 14 could be a conventional electrical system 14 having a battery, or other electricity storage device, and an alternator or generator to recharge the battery and provide electricity when the engine 10 is running.

Figure 2:
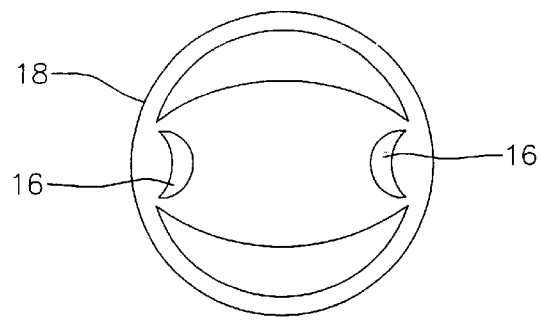
FIG. 2 is a front view of a steering wheel of the present invention with a control switch mounted thereon.

The device of the present invention includes a control switch 16 electrically connected to the electrical system 14. The control switch 16 is mounted where the driver and, optionally, the passenger may easily access the control switch 16. As shown in FIG. 2, the control switch 16 may optionally be mounted on the steering wheel 18 of the motor vehicle 10. In such an embodiment, the control switch 16 may optionally be mounted near the perimeter of the steering wheel 18 where it does not interfere with the driver's ability to control the motor vehicle 10, yet is easily accessible in the event of an emergency.

Referring again to FIGS. 1 and 3, the control switch 16 controls a lamp 20. In an optional embodiment, the control switch 16 additionally controls a means 22 for disabling the motor vehicle 10. That is, in such an optional embodiment, the control switch 16 is electrically connected to the lamp 20 and disabling means 22 such that the lamp 20 and disabling means 22 are activated when the control switch 16 is actuated. In an alternate embodiment, the disabling means 22 and lamp 20 are separately controlled.

The lamp 20 could be any visible signal known in the art. In an optional embodiment, the lamp 20 is a blinking colored lamp to distinguish the lamp 20 from the dome light in the interior of the motor vehicle 10 as well as provide enough illumination to be readily visible from outside the motor vehicle 10. In one optional embodiment, the lamp 20 is mounted near the center of the interior ceiling of the motor vehicle 10. In an alternate optional embodiment, the lamp 20 is mounted on the interior ceiling near one or both of the doors of the motor vehicle 10. In a further optional embodiment, a plurality of lamps 20 may be provided with each lamp 20 on the interior ceiling near each door of the motor vehicle 10. Optionally, the lamp 20 may be mounted near or in the rear window of the motor vehicle 10. For example, the lamp 20 may be embedded in the material of the rear window or may overlay the rear window in a fashion similar to embedded or overlaying defrosters known in the art. Optionally the control switch 16 may also be electrically connected to the motor vehicle's 10 horn 17 to thereby issue an audible warning when the control switch 16 is actuated.

Figure 4:
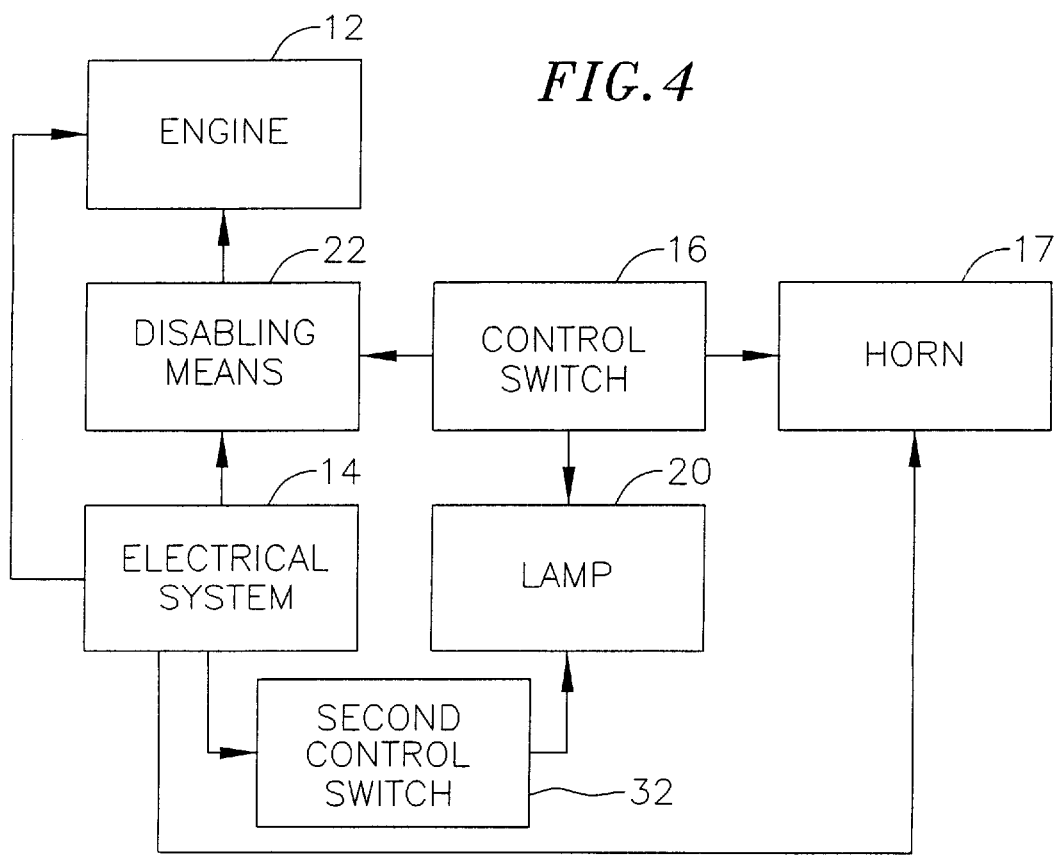
FIG. 4 is a block diagram of an alternate embodiment of the an emergency system.

It is contemplated that the control switch 16 may: (a) control only the lamp 20; (b) control both the lamp 20 and the disabling means 22; or (c) control only the disabling means 22. Additionally, it is contemplated that separate controls may control the lamp 20 and the disabling means 22. It is also contemplated that one control may be provided to actuate the lamp 20 only and a separate control provided to actuate the lamp 20 and the disabling means 22. In this fashion, one control could be used to actuate the lamp 20 to signal a hazard condition, such as inclement weather, an accident, a traffic stoppage, or the like, and a separate control could be used to actuate both a lamp 20 and a disabling means 22 to signal other drivers and stop the motor vehicle 10 in the event of a medical or other emergency. This embodiment is shown in FIG. 4 and described in more detail below.

Referring first to the embodiment of FIG. 3, the control switch 16 electrically communicates with a lamp 20 and a disabling means 22. The disabling means 22 may take many different forms. However, in an optional embodiment, the disabling means 22 is a fuel cutoff valve that stops the flow of fuel from the motor vehicle fuel system to the engine 12 to thereby disable the engine 12. Alternatively, in a spark ignition engine, the disabling means 22 could include an ignition switch that prevents the electrical system 14 from sending electricity to the spark plugs, thereby disabling the engine 12. Similarly, in an electric motor vehicle, the disabling means 22 could include an electrical system 14 switch to cease the flow of electricity to the engine 12.

Regardless of the specific configuration of the disabling means 22, the disabling means 22 is powered by the electrical system 14 and is electrically connected to both the electrical system 14 and the engine 12 of the motor vehicle 10. In an optional embodiment, the disabling means 22 may also be electrically connected to the motor vehicle's 10 brakes. Thus, the disabling means 22 could actuate the brakes or otherwise slow the motor vehicle 10 when the control switch 16 is actuated.

In use, the control switch 16 may be actuated in the event of emergency. For example, the control switch 16 could be actuated if a driver becomes physically or mentally disabled or incapacitated, such as in the event of a seizure, heart attack, or other illness. When actuated, the control switch 16 activates the lamp 20 and simultaneously activates the disabling means 22. The lamp 20 illuminates, optionally in a blinking fashion to warn oncoming traffic and trailing traffic of the disability or incapacitation of the driver and allow surrounding traffic to react accordingly. Likewise, the visible warning issued by the lamp 20 may indicate that the driver requires assistance and thereby prompt drivers in nearby motor vehicles to call for assistance.

As noted above, in the optional embodiment of FIG. 3, actuation of the control switch 16 simultaneously activates the disabling means 22. As the disabling means 22 disables the engine 12, the wheels of the motor vehicle 10 cease to receive any power from the engine 12. Optionally, the disabling means 22 turns off the engine 12 of the motor vehicle 10. In an optional embodiment in which the control switch 16 communicates with the motor vehicle's 10 brakes, the motor vehicle 10 is additionally slowed by the application of the brakes as controlled by the control switch 16.

After the motor vehicle 10 ceases its forward motion, or after a preset period of time, or after manual deactivation, the control switch 16 resets itself and deactivates the lamp 20 and the disabling means 22. The motor vehicle's 10 engine 12 may then be restarted and the motor vehicle 10 may be safely driven.

Referring now to the alternate optional embodiment of FIG. 4, a first control switch 30 electrically communicates with a lamp 20 and a disabling means 22 and a second control switch 32 electrically communicates only with a lamp 20. While two switches 30, 32 are shown in FIG. 4, it can be appreciated that the switches 30, 32 could be replaced with a multicontact switch where different contacts of the single switch control (a) the lamp 20 and (b) the lamp 20 and the disabling means 22.

Again, the disabling means 22 may take many different forms including a fuel cutoff valve or a means for inhibiting the electrical system 14 from sending electricity to the spark plugs. In the embodiment of FIG. 4, there are provided two modes of use. In a first mode of use, specifically directed for use when a driver is disabled or incapcitated, a first control switch 30 may be actuated to activate the lamp 20 and simultaneously activate the disabling means 22. This first mode of use functions substantially like the device shown in FIG. 3 and described above.

With continued reference to FIG. 4, in a second mode of use, a second control switch 32 may be actuated to activate only the lamp 20. In this fasion, the second mode of use may be used when the driver wishes to maintain control of the motor vehicle 10, i.e. not disable the motor vehicle 10, yet alert other drivers to a hazard condition such as inclement weather, traffic stoppage, hazardous road conditions or the like. As with the first mode of operation, in the second mode of operation, the lamp 20 illuminates, optionally in a blinking fashion, to warn oncoming traffic and trailing traffic in response to actuation of the second control switch 32. Again, the optional embodiment of FIG. 4 could optionally include connections to the motor vehicle's 10 horn 17 from the first control switch 30, second control switch 32, or both.

The system of the present invention could be installed into the motor vehicle as it is manufactured or, alternatively, as an aftermarket kit. While some components may be more appropriate for manufacturer installation, it is contemplated that other components could be installed by a motor vehicle owner as a part of a kit. For example, the motor vehicle manufacturer could install the present invention utilizing lamps 20 embedded in, or overlaid over, the rear window. Alternatively, lamps 20 in the ceiling and near the doors could be offered as part of an aftermarket kit.

While certain embodiments of the present invention have been shown and described it is to be understood that the present invention is subject to many modifications and changes without departing from the spirit and scope of the claims presented herein.

I claim:

1. An emergency system for a motor vehicle of the type having an engine providing power to the drive wheels of the motor vehicle and an electrical system, said motor vehicle including a passenger compartment, comprising:

an internal lamp mounted in the interior passenger compartment of said motor vehicle electrically connected to the motor vehicle's electrical system, said lamp illuminating the interior of the motor vehicle when actuated;

a control switch mounted in the passenger compartment of said motor vehicle electrically communicating with said lamp to actuate the lamp; and means for disabling the motor vehicle engine electrically communicating with said control switch such that actuation of said control switch simultaneously activates said lamp and disables the engine of the motor vehicle.

2. The system of claim 1 further comprising a second control switch electrically communicating with said lamp to actuate the lamp only.

3. The system of claim 1 in which said motor vehicle further includes a fuel system directing fuel into said engine for combustion, wherein said disabling means comprises a fuel cutoff switch in said fuel system.

4. The system of claim 1 in which said motor vehicle further comprises a braking system connected to one or more wheels of the motor vehicle, wherein said disabling means comprises brake actuators in said braking system.

5. The system of claim 1 in which said electrical system communicates with said engine, the disabling means comprising a switch to stop the flow of electricity from said electrical system to said engine.

6. An emergency system for a motor vehicle of the type having an engine providing power to the drive wheels of the motor vehicle and an electrical system, said motor vehicle including a passenger compartment, comprising:

an internal lamp mounted in the interior passenger compartment of said motor vehicle electrically connected to the motor vehicle's electrical system, said lamp illuminating the interior of the motor vehicle when actuated;

a control switch mounted in the passenger compartment of said motor vehicle electrically communicating with said lamp to actuate the lamp;

means for disabling the motor vehicle engine electrically communicating with said control switch such that actuation of said control switch simultaneously activates said lamp and disables the engine of the motor vehicle; and a second control switch electrically communicating with said lamp to actuate the lamp only.

7. The system of claim 6 in which said motor vehicle further includes a fuel system directing fuel into said engine for combustion, wherein said disabling means comprises a fuel cutoff switch in said fuel system.

8. The system of claim 6 in which said motor vehicle further comprises a braking system connected to one or more wheels of the motor vehicle, wherein said disabling means comprises brake actuators in said braking system.

9. The system of claim 6 in which said electrical system communicates with said engine, the disabling means comprising a switch to stop the flow of electricity from said electrical system to said engine.

* * * * *